(12) United States Patent
Bookstaff

(10) Patent No.: US 8,363,806 B2
(45) Date of Patent: *Jan. 29, 2013

(54) METHOD AND SYSTEM FOR ALPHANUMERIC INDEXING FOR ADVERTISING VIA CLOUD COMPUTING

(76) Inventor: Blake Bookstaff, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,442

(22) Filed: Mar. 5, 2012

(65) Prior Publication Data

US 2012/0185307 A1 Jul. 19, 2012

Related U.S. Application Data

(63) Continuation-in-part of application No. 11/636,211, filed on Dec. 8, 2006, now Pat. No. 8,130,928, which is a continuation-in-part of application No. 10/303,903, filed on Nov. 26, 2002, now Pat. No. 7,187,761.

(60) Provisional application No. 60/424,311, filed on Nov. 7, 2002.

(51) Int. Cl.
*H04M 3/42* (2006.01)
*H04L 12/66* (2006.01)

(52) U.S. Cl. ............... 379/201.01; 370/356; 379/213.01

(58) Field of Classification Search ............. 379/201.01, 379/204.01, 211.03, 213.01, 213.02; 370/352, 370/356
See application file for complete search history.

(56) References Cited

U.S. PATENT DOCUMENTS

| 3,928,724 | A | 12/1975 | Byram et al. |
| 4,053,949 | A | 10/1977 | Recca et al. |
| 4,071,698 | A | 1/1978 | Barger, Jr. et al. |
| 4,232,199 | A | 11/1980 | Boatwright et al. |
| 4,446,337 | A | 5/1984 | Cofer |
| 4,451,704 | A | 5/1984 | Winkelman |
| 4,608,460 | A | 8/1986 | Carter et al. |
| 4,654,482 | A | 3/1987 | DeAngelis |
| 4,791,666 | A | 12/1988 | Cobb et al. |
| 4,850,007 | A | 7/1989 | Marino et al. |
| 4,897,866 | A | 1/1990 | Majmudar et al. |
| 4,918,719 | A | 4/1990 | Daudelin |
| 4,943,995 | A | 7/1990 | Daudelin et al. |
| 4,959,855 | A | 9/1990 | Daudelin |
| 4,975,941 | A | 12/1990 | Morganstein et al. |
| 4,979,206 | A | 12/1990 | Padden et al. |
| 5,131,024 | A | 7/1992 | Pugh et al. |
| 5,377,354 | A | 12/1994 | Scannell |
| 5,425,097 | A | 6/1995 | Pula |
| 5,448,625 | A | 9/1995 | Lederman |
| 5,473,671 | A | 12/1995 | Partridge, III |

(Continued)

FOREIGN PATENT DOCUMENTS

EP 1 662 366 A1 5/2006
WO WO 00/38399 A 6/2000

(Continued)

OTHER PUBLICATIONS

Partial European Search Report EP 08 01 8481 Dated: Nov. 28, 2008.

(Continued)

*Primary Examiner* — Harry Hong
(74) *Attorney, Agent, or Firm* — Lesavich High-Tech Law Group, P.C.; Stephen Lesavich

(57) ABSTRACT

A method and system for alphanumeric identifier indexing for advertising with cloud computing. Alphanumeric identifiers (e.g., telephone number, voice-over-Internet Protocol (VoIP) identifier, Internet Protocol (IP) identifier, a text message identifier, an instant message (IM) identifier, an e-mail address identifier, a social network identifier, a social networking hash code, etc.) are used to categorize and associate pre-determined advertising with the alphanumeric identifiers. When the alphanumeric identifier is received anywhere on a cloud computing network, the pre-determined advertising associated with the alphanumeric identifier is sent to a target device.

13 Claims, 8 Drawing Sheets

U.S. PATENT DOCUMENTS

| | | | |
|---|---|---|---|
| 5,475,746 A | 12/1995 | Miller et al. |
| 5,485,511 A | 1/1996 | Iglehart et al. |
| 5,515,098 A | 5/1996 | Carles |
| 5,544,236 A | 8/1996 | Andruska et al. |
| 5,619,562 A | 4/1997 | Maurer et al. |
| 5,642,407 A | 6/1997 | He |
| 5,652,784 A | 7/1997 | Blen et al. |
| 5,661,788 A | 8/1997 | Chin |
| 5,701,419 A | 12/1997 | McConnell |
| 5,734,710 A | 3/1998 | Hirth et al. |
| 5,751,802 A | 5/1998 | Carr et al. |
| 5,757,899 A | 5/1998 | Boulware et al. |
| 5,802,149 A | 9/1998 | Hanson |
| 5,825,862 A | 10/1998 | Voit et al. |
| 5,835,570 A | 11/1998 | Wattenbarger |
| 5,852,775 A | 12/1998 | Hidary |
| 5,873,032 A | 2/1999 | Cox et al. |
| 5,875,231 A | 2/1999 | Farfan et al. |
| 5,878,338 A | 3/1999 | Alperovich et al. |
| 5,880,770 A | 3/1999 | Ilcisin et al. |
| 5,892,820 A | 4/1999 | Armstrong |
| 5,943,410 A | 8/1999 | Shaffer et al. |
| 5,966,437 A | 10/1999 | Cox et al. |
| 5,983,544 A | 11/1999 | Fagan |
| 6,031,904 A | 2/2000 | An et al. |
| 6,035,190 A | 3/2000 | Cox et al. |
| 6,038,307 A | 3/2000 | Fahrer et al. |
| 6,061,439 A | 5/2000 | Bleile et al. |
| 6,084,628 A | 7/2000 | Sawyer |
| 6,104,786 A | 8/2000 | Gibilisco et al. |
| 6,118,860 A | 9/2000 | Hillson et al. |
| 6,178,446 B1 | 1/2001 | Gerszberg et al. |
| 6,188,751 B1 | 2/2001 | Scherer |
| 6,198,812 B1 | 3/2001 | Weber |
| 6,205,215 B1 | 3/2001 | Dombakly |
| 6,256,515 B1 | 7/2001 | Cox et al. |
| 6,301,338 B1 | 10/2001 | Makela |
| 6,301,342 B1 | 10/2001 | Ander et al. |
| 6,310,948 B1 | 10/2001 | Nemeth |
| 6,324,273 B1 | 11/2001 | Alcott |
| 6,327,343 B1 | 12/2001 | Epstein et al. |
| 6,327,344 B1 | 12/2001 | Paxson |
| 6,347,225 B1 | 2/2002 | Nishiyama |
| 6,353,852 B1 | 3/2002 | Nestoriak, III et al. |
| 6,381,320 B1 | 4/2002 | Creamer et al. |
| 6,400,804 B1 | 6/2002 | Bilder |
| 6,456,709 B1 | 9/2002 | Cox et al. |
| 6,473,612 B1 | 10/2002 | Cox et al. |
| 6,504,912 B1 | 1/2003 | Glossbrenner |
| 6,516,311 B1 | 2/2003 | Yacoby |
| 6,587,138 B1 | 7/2003 | Vogt et al. |
| 6,587,549 B1 | 7/2003 | Weik |
| 6,590,970 B1 | 7/2003 | Cai et al. |
| 6,597,769 B2 | 7/2003 | Snow |
| 6,614,896 B1 | 9/2003 | Rao |
| 6,618,474 B1 | 9/2003 | Reese |
| 6,633,850 B1 | 10/2003 | Gabbard |
| 6,668,281 B1 | 12/2003 | Ayyadurai |
| 6,718,551 B1 | 4/2004 | Swix et al. |
| 6,856,673 B1 | 2/2005 | Banks et al. |
| 6,965,919 B1 | 11/2005 | Woods et al. |
| 6,977,997 B2 | 12/2005 | Shioda et al. |
| 7,013,323 B1 | 3/2006 | Thomas |
| 7,100,199 B2 | 8/2006 | Ginter |
| 7,187,761 B2 | 3/2007 | Bookstaff |
| 7,227,936 B2 | 6/2007 | Bookstaff |
| 7,573,993 B2 | 8/2009 | Bookstaff |
| 7,720,828 B2 | 5/2010 | Bookstaff |
| 8,078,977 B2 | 12/2011 | Bookstaff |
| 8,130,928 B2 | 3/2012 | Bookstaff |
| 8,254,547 B2 | 8/2012 | Bookstaff et al. |
| 8,254,548 B2 | 8/2012 | Bookstaff et al. |
| 8,254,549 B2 | 8/2012 | Bookstaff et al. |
| 2001/0012344 A1 | 8/2001 | Kwon |
| 2002/0044639 A1 | 4/2002 | Shioda et al. |
| 2002/0049968 A1 | 4/2002 | Wilson et al. |
| 2002/0051521 A1 | 5/2002 | Patrick |
| 2002/0091566 A1 | 7/2002 | Siegel |
| 2002/0107730 A1 | 8/2002 | Bernstein |
| 2002/0193095 A1 | 12/2002 | Hutcheson et al. |
| 2002/0194061 A1 | 12/2002 | Himmel et al. |
| 2003/0007620 A1 | 1/2003 | Elsey et al. |
| 2003/0033198 A1 | 2/2003 | Flannery et al. |
| 2003/0041126 A1 | 2/2003 | Buford |
| 2003/0050837 A1 | 3/2003 | Kim |
| 2003/0063721 A1 | 4/2003 | Hirose |
| 2003/0161464 A1 | 8/2003 | Rodriguez et al. |
| 2003/0177063 A1 | 9/2003 | Currans et al. |
| 2003/0212710 A1 | 11/2003 | Guy |
| 2003/0223563 A1 | 12/2003 | Wolmuth |
| 2003/0231754 A1 | 12/2003 | Stein et al. |
| 2004/0023644 A1 | 2/2004 | Montemer |
| 2004/0039786 A1 | 2/2004 | Horvitz et al. |
| 2004/0107125 A1 | 6/2004 | Guheen et al. |
| 2005/0182673 A1 | 8/2005 | Marzian et al. |
| 2005/0216457 A1 | 9/2005 | Walther |
| 2005/0289113 A1 | 12/2005 | Bookstaff |
| 2006/0161524 A1 | 7/2006 | Roy |
| 2007/0106654 A1 | 5/2007 | Bookstaff |
| 2007/0130030 A1 | 6/2007 | Bookstaff |
| 2007/0253544 A1 | 11/2007 | Bookstaff |
| 2009/0168987 A1 | 7/2009 | Bookstaff |
| 2009/0175431 A1 | 7/2009 | Bookstaff |
| 2009/0175433 A1 | 7/2009 | Bookstaff |
| 2010/0268597 A1 | 10/2010 | Bookstaff |
| 2010/0268632 A1 | 10/2010 | Rosenthal et al. |
| 2011/0208710 A1 | 8/2011 | Lesavich |
| 2012/0084665 A1 | 4/2012 | Bookstaff |

FOREIGN PATENT DOCUMENTS

| | | |
|---|---|---|
| WO | WO 01/47264 A | 6/2001 |
| WO | WO 2004/029759 | 4/2004 |
| WO | WO 2004/042525 | 5/2004 |
| WO | WO 2007/024868 A2 | 3/2007 |

OTHER PUBLICATIONS

Partial PCT Search Report PCT/US2007/024,995, Dated: Oct. 30, 2008.

Partial Canadian Patent Office Search Report 2,569,529, Dated: Feb. 22, 2007.

"Yahoo Block" Internet Citation, [Online] (Jun. 18, 2005), XP-002413362 Retrieved from the, internet Jan. 3, 2007.

Partial PCT Search Report PCT/US2005/023,495, Dated: Apr. 26, 2007.

http://gmail.google.com, Jun. 16, 2004, retrieved on Feb. 14, 2007 at http://archive.org/web/web.php by Canadian Patent Office.

Partial PCT Search Report PCT/US2003/035,617, Dated: May 10, 2004.

Partial PCT Search Report, PCT/US2007/024997 Dated:Apr. 17, 2008.

Webwasher Com AG (Mar. 28, 2000), XP-002156461: Siemens-Backed WebWasher Empowers Companies to Remove Unwanted Web Content and Ensure Privacy *Protection, Internet Citation*, URL:http://www.seomoz.org/blogdetail.php?I,2pages.
Internet:URL:http://www.seomoz.ort/blogdetail.php?ID=206> [retrieved on Jan. 3, 2007] the whole document.

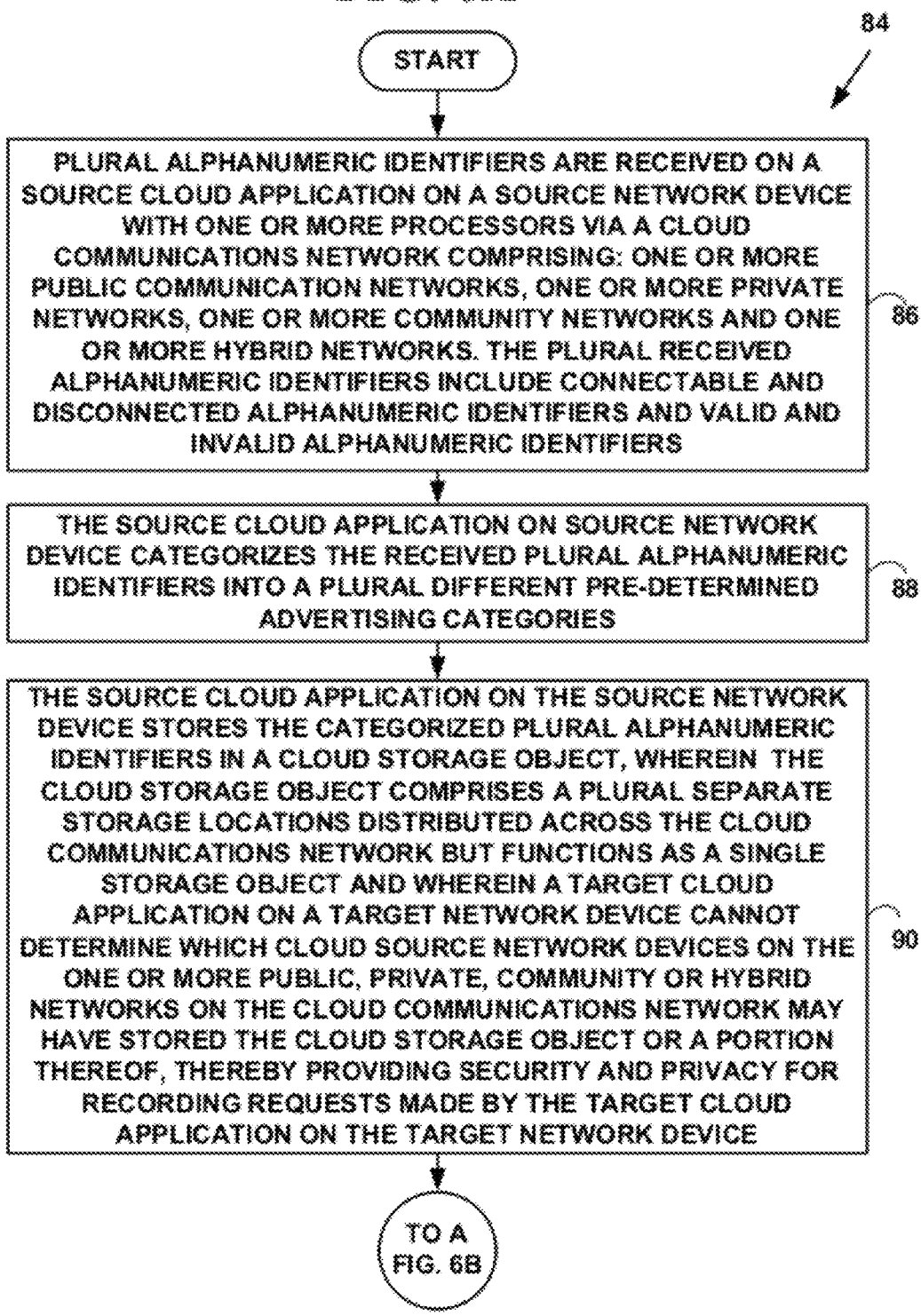

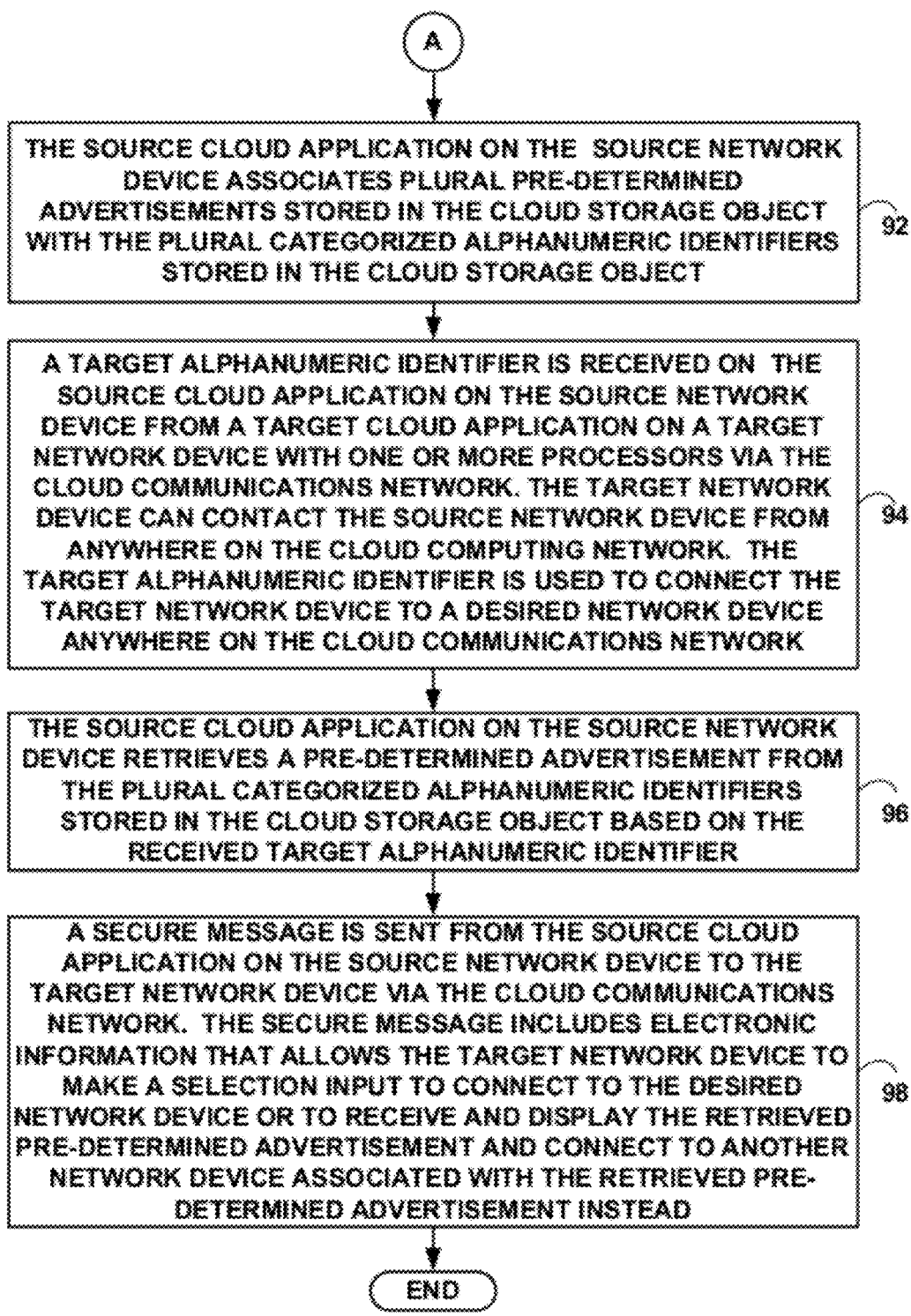

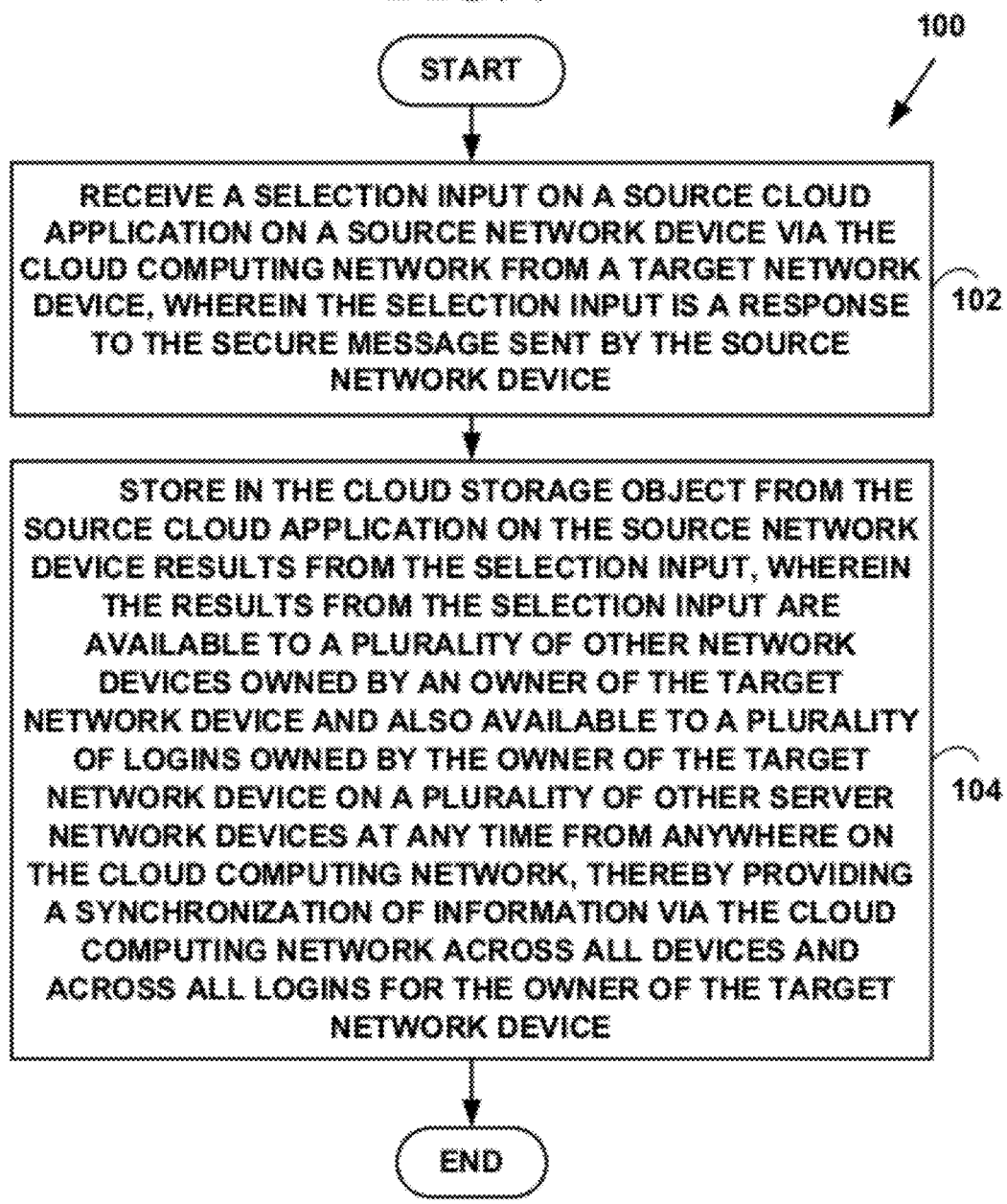

METHOD AND SYSTEM FOR ALPHANUMERIC INDEXING FOR ADVERTISING VIA CLOUD COMPUTING

CROSS REFERENCES TO RELATED APPLICATIONS

This application is a Continuation-In-Part (CIP) of U.S. application Ser. No. 11/636,211 filed on Dec. 8, 2006, which issued as U.S. Pat. No. 8,130,928, on Mar. 6, 2012, which is a CIP of U.S. application Ser. No. 10/303,903, filed Nov. 26, 2002 and is an application that claims priority to U.S. Provisional patent application 60/424,311, filed Nov. 7, 2002, which issued as U.S. Pat. No. 7,187,761, the contents of all of which are incorporated by reference.

FIELD OF INVENTION

This application relates to automatic processing of electronic information. More specifically, it relates to a method and system for alphanumeric indexing for advertising via cloud computing.

BACKGROUND OF THE INVENTION

The Internet and World-Wide-Web have changed the way organizations conduct business. Virtually every organization has a web-site that provides information about the organization and a description of the goods and/or services an organization may offer. As is known in the art, a "web-site" is group of related mark-up language documents and associated graphics and multi-media files, scripts, and databases, etc. that are served up by a server on the World-Wide-Web via the Internet. Business organizations also provide an electronic commerce (e-commerce) interface that allows users to purchase goods and/or services from such organizations.

There are many different type of web-sites on a spectrum ranging from very simple to very complex. Designing, implementing and deploying a web-site requires knowledge of markup languages such as Hyper Text Markup Language (HTML), eXtensible Markup Language (XML), programming languages such as JAVA, C++, C#, computer graphics functionality, multi-media functionality, etc. A knowledge of communications protocols such as Hyper Text Transfer Protocol (HTTP), Transmission Control Protocol (TCP), Internet Protocol (IP), e-mail protocols such as Simple Mail Transfer Protocol (SMTP), e-commerce protocols, encryption and other security protocols and many other types of protocols for various kinds of web functionalities.

With the proliferation of cell phones and other technology, the payphone and traditional telephone industry has seen a rapid decline in revenue including advertising revenues.

There have been attempts to solve some of the problems associated with electronic advertising. U.S. Published Application No. 20020107730, entitled "Method and apparatus for identifying customers for delivery of promotional materials," that was published by Bernstein discloses "a method and apparatus are provided for identifying potential customers for delivery of promotional materials. The method includes the steps of forming a customer profile by a vendor for targeting delivery of the promotional materials to potential customers, identifying customers which match the customer profile within a database of a third party and forwarding promotional materials to the identified customers.

For example, U.S. Published Patent Application No. 20030231754, entitled "Telephone call redirection system," that was published by Stein et al. discloses "telephone call redirection system for misdialed telephone numbers is provided. When a caller physically and unintentionally dials one of a set of first numbers subscribed to by the system, the system recognizes the number intended by the caller, and provides the caller with the option of being redirected. If interested, the caller dials another number offered by the system to hear of the desired, intended number."

U.S. Published Application No. 20030177063 entitled "Custom data ADS," that was published by Currrans et al. discloses "aspects of the present invention provide methods, a computer system, a computer medium and an article of manufacture for generating personalized advertising to accompany information to be sent to a user. In one embodiment, the method includes the steps of maintaining, in memory, a plurality of user profiles and a plurality of images associated with each user profile and selecting an image associated with the user. Next, the image is inserted into advertising to provide personalized advertising."

U.S. Pat. No. 5,642,407 that issued to He et al. entitled "System and method for selected audio response in a telecommunications network" teaches "a system and method for selected audio response to a telephone call that results in an unsuccessful connection. If a condition within the set of conditions is satisfied based on attributes associated with the caller or the telephone call, an action list associated with the satisfied condition is executed. The action list can comprise a selected audio response that is transmitted to the caller of the unsuccessful connection."

However, none of these attempts solve all of the problems associated with electronic advertising. Thus, it is desirable to provide method and system for improved advertising from telephones and via cloud computing networks.

SUMMARY OF THE INVENTION

In accordance with preferred embodiments of the invention, some of the problems associated with electronic advertising are overcome. A method and system for alphanumeric indexing for advertising is presented.

A method and system for alphanumeric indexing for advertising with cloud computing. Alphanumeric identifiers (e.g., telephone number, voice-over-Internet Protocol (VoIP) identifier, Internet Protocol (IP) identifier, an instant message (IM) identifier, a text message identifier, an e-mail address identifier, a social networking identifier, a social networking hash code, etc.) are used to categorize and associate pre-determined advertising with the alphanumeric identifiers. When the alphanumeric identifier is received anywhere on a cloud computing network, the pre-determined advertising associated with the alphanumeric identifier is sent to a target device.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 6A and 6B a flow diagram illustrating a method for alphanumeric identifier indexing for advertising with cloud computing; and FIG. 7 is a flow diagram illustrating a method for alpha numeric identifier indexing for advertising with cloud computing.

DETAILED DESCRIPTION OF THE INVENTION

Exemplary Electronic Information Message Processing System

Figure 1:
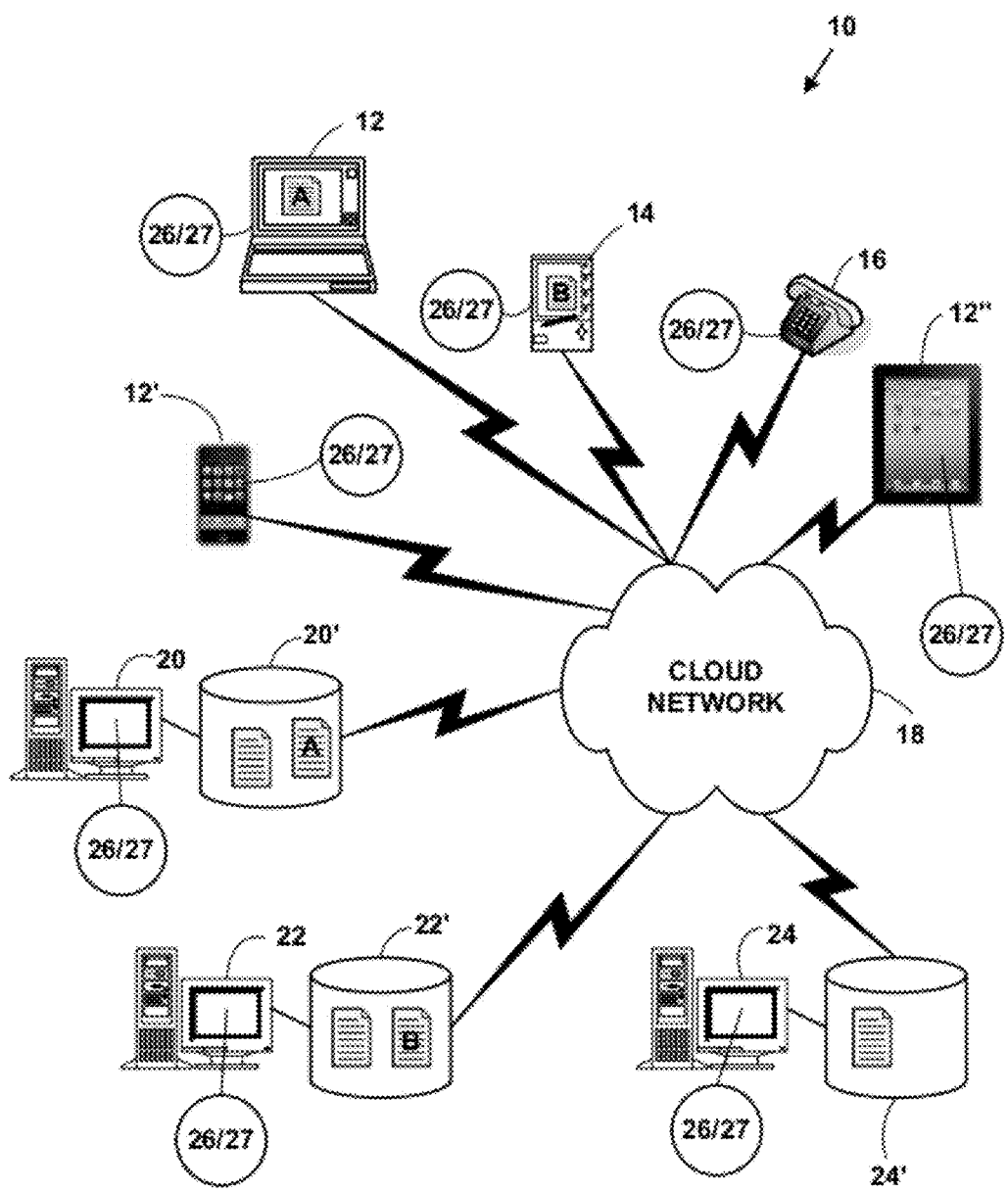
FIG. 1 is a block diagram illustrating an exemplary electronic information processing system.

FIG. 1 is a block diagram illustrating an exemplary electronic information system 10. The exemplary electronic information message processing system 10 includes, but is not limited to, one or more target network devices 12, 14, 16 (only three of which are illustrated) each with one or more processors.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV) set-top boxes, satellite television boxes, digital televisions including high definition television (HDTV), three-dimensional (3D) televisions and other types of network devices.

The one or more target network devices 12, 14, 16 also include smart phones (e.g., 12', etc.) such as the iPhone by Apple, Inc., Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more target network devices 12, 14, 16 also include tablet computers (e.g., 12", etc.) such as the iPad, by Apple, Inc., the HP Tablet, by Hewlett Packard, Inc., the Playbook, by RIM, Inc., the Tablet, by Sony, Inc.

The target network devices 12, 14, 16 are in communications with a communications network 18. The communications network 18 includes, but is not limited to, a cloud computing network 18 including one or more portions of the Internet, an intranet, a wired Local Area Network (LAN), a wireless LAN (WiLAN), a Wide Area Network (WAN), a Metropolitan Area Network (MAN), Public Switched Telephone Network (PSTN) and other types of wired and wireless communications networks providing voice, video and data communications with wired or wireless communication protocols.

Plural server network devices (source network devices) 20, 22, 24 (only three of which are illustrated) each with one or more processors include one or more associated databases 20', 22', 24'. The plural source network devices 20, 22, 24 are in communications with the one or more target network devices 12, 14, 16 via the communications network 18. The plural source network devices 20, 22, 24, include, but are not limited to, electronic mail (e-mail) servers, World Wide Web servers, Internet servers, file servers, other types of electronic information servers, and other types of server network devices (e.g., edge servers, firewalls, routers, gateways, switches, etc.).

The communications network 18 may include one or more gateways, routers, bridges, switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

In one embodiment, the target network devices 12, 14, 16 and the source network devices 20, 22, 24 include an advertising application 26 with plural software modules. The application 26 further includes a cloud application 27. The plural target network devices 12, 14, 16 may also include a plug-in 28 for a browser with plural software modules which communicates with applications 26 and 27. The multiple software modules may be implemented in firmware, hardware or any combination thereof. In one embodiment, the target network devices 12, 14, 16 may include a plug-in 28 for a browser with plural software modules.

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, or the ADSL Forum. However, network devices based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

A non-mobile target network device (e.g., a payphone, etc.), includes a smart chip with plural software modules in communications with the communications network 18. In one embodiment the smart chip is programmed specifically for a home geographic area for the target network device. In another embodiment, the target network device is mobile. As the target network device is moved to a new geographic area, the smart chip communicates with the communications network 18 to receive dynamic advertising information that is based on the geographic area.

The communications network 18 may also include one or more servers or access points (AP) including wired and wireless access points (WAP) (not illustrated).

The communications network 18 includes data networks using the Transmission Control Protocol (TCP), User Datagram Protocol (UDP), Internet Protocol (IP) and other data protocols.

The communications network 18 may also include wired interfaces connecting portions of a PSTN or cable television network that connect the network devices 12, 14, 16 via one or more twisted pairs of copper wires, coaxial cable, fiber optic cable, other connection media or other connection interfaces. The PSTN is any public switched telephone network provided by AT&T, GTE, Sprint, MCI, SBC, Verizon and others.

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

In one embodiment of the present invention, the wired and wireless interfaces include wired and wireless interfaces and corresponding networking protocols for wired connections to the communications network 18 including, a Public Switched Telephone Network (PSTN) or a cable television network (CATV) including HDTV that connect the target network devices 12, 14, 16 via one or more twisted pairs of copper wires, digital subscriber lines (e.g. DSL, ADSL, VDSL, etc.) coaxial cable, fiber optic cable, other connection media or other wired connection interfaces. The PSTN is any public switched telephone network provided by AT&T, GTE, Sprint, MCI, SBC, Verizon and others.

The communications network 18 may also include a paging and wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network or other types of computer networks.

The wireless cellular telephone network includes, but is not limited to Code Division Multiple Access (CDMA), Time Division Multiple Access (TDMA), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, fax, caller ID, Internet access, and e-mail.

As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network (PCN) includes various types of packetized cellular data.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (WiFi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the target network devices 14, 16 include a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, WiFi is a type of 802.11xx interface, whether 802.11b, 802.11a, dual-band, etc. WiFi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The target devices 12, 14, 16 include a protocol stack with multiple layers based on the Internet Protocol or OSI reference model. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated February 1998, September 1999, November 2000 and July 2003 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated February 1998 and March 2002 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Security and Encryption

Devices and interfaces of the present invention include plural security and/or encryption methods for secure communications via the computer network 18. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Alphanumeric Identifier Indexing for Advertising

Figure 2:
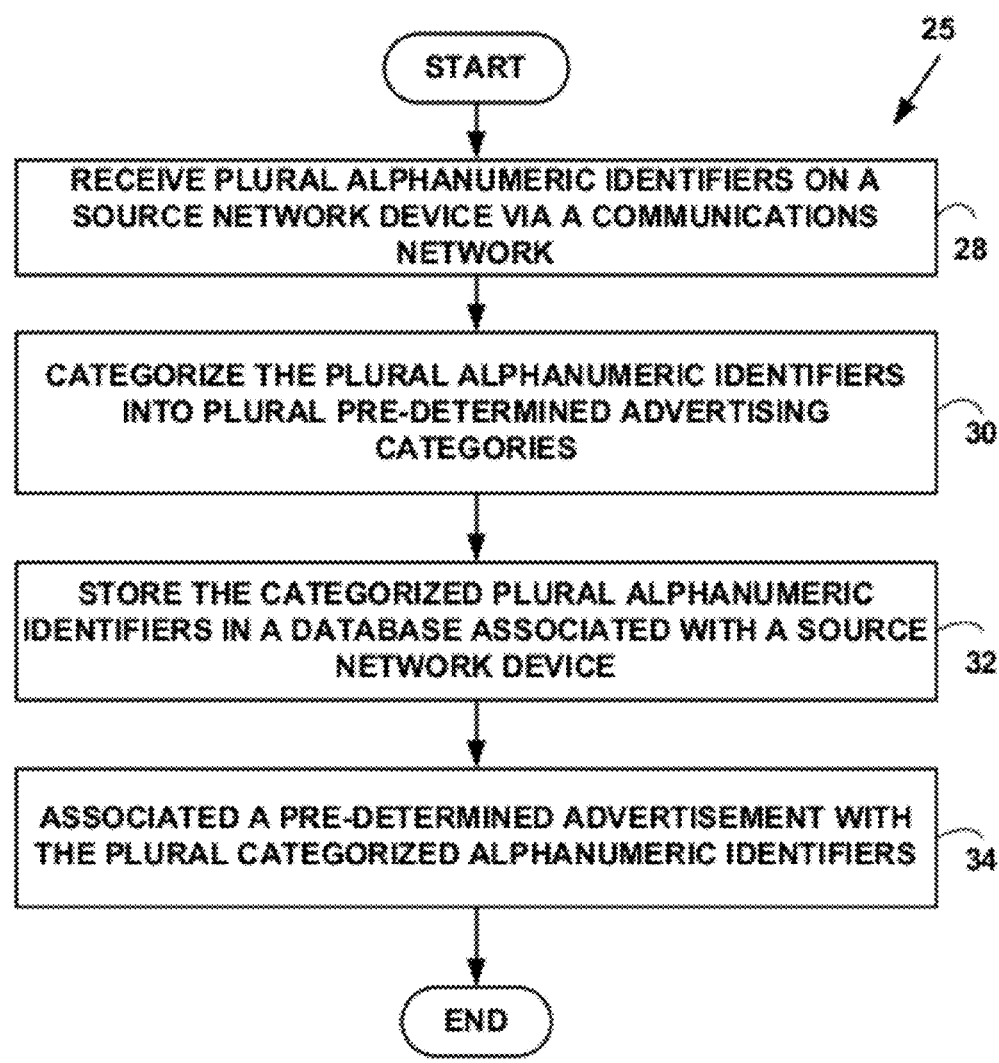
FIG. 2 is a flow diagram illustrating a method for number indexing for advertising.

FIG. 2 is a flow diagram illustrating a Method 25 for automatically indexing alphanumeric identifiers. At Step 28, plural alphanumeric identifiers are received on a source network device via a communications network. At Step 30, the plural alphanumeric identifiers are categorized into plural pre-determined advertising categories. At Step 32, the categorized plural alphanumeric identifiers are stored in a database associated with a source network device. At Step 34, a pre-determined advertisement is associated with the plural categorized alphanumeric identifiers.

Method 27 is illustrated with one exemplary embodiment. However, the present invention is not limited to such an embodiment and other embodiments can also be used to practice the invention.

At Step 28, plural alphanumeric identifiers are received on a source network device 20, 22, 24 via a communications network 18.

In one embodiment the alphanumeric identifier includes telephone numbers, instant message identifiers, or e-mail address identifiers, VoIP identifiers or IP identifiers.

In one embodiment, the plural alphanumeric identifiers are received on the source network device 20, 22, 24, in a bulk transfer from an alphanumeric identifier supplier (e.g., telephone service provider, instant message provider, e-mail provider, VoIP service provider, etc.) before any individual alphanumeric identifiers are received on the communications network 18.

In another embodiment, the plural alphanumeric identifiers are not received ahead of time but instead are dynamically received on the source network device 20, 22, 24 as they are received on the communications network 18.

At Step 30, the plural alphanumeric identifiers are categorized into plural pre-determined advertising categories. For examples, pre-determined advertising categories are created for virtually any type of goods, services, public service announcements, political advertisements, etc.

At Step 32, the categorized plural alphanumeric identifiers are stored in a database 20', 22', 24' associated with a source network device 20, 22, 24. In one embodiment, the database 20', 22', 24' uses advertising categories identical to those provided by a telephone service provider (e.g., yellow pages categories, etc.). In another embodiment, the database 20', 22', 24' uses other types of pre-determined advertising categories such as disconnected numbers, etc.

At Step 34, a pre-determined advertisement is associated with the plural categorized alphanumeric identifiers. The database 20', 22' 24' is used to track and match advertising for the pre-determined advertising categories.

In one embodiment, the pre-determined advertisement includes a recorded audio, video, graphical or electronic text advertisement.

In one embodiment, the pre-determined advertisements are sold to one advertiser for an advertising category. For example, for pizza restaurants, Domino's Pizza my purchase all advertising for pizza restaurants. Any alphanumeric identifiers received and categorized for pizza restaurants would be associated with Domino's Pizza advertising.

In another embodiment, the pre-determined advertisements are sold to plural advertisers for advertising categories. In such an embodiment, the pre-determined advertisements are associated based on a number of pre-determined methods such as round-robin method, a weighted method, depending on an amount of advertising purchased, etc.

Using Alphanumeric Identifier Indexing for Advertising

Figure 3:
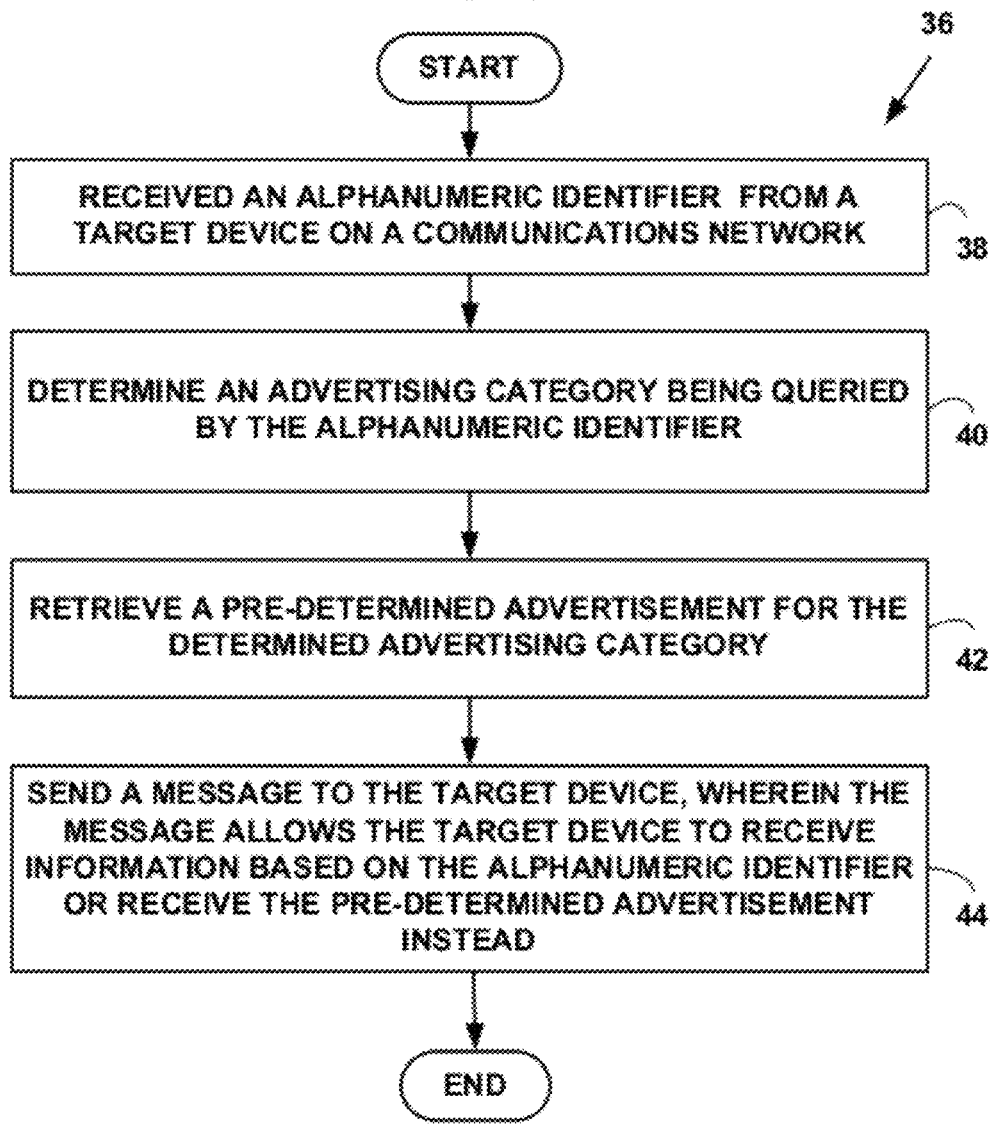
FIG. 3 is a flow diagram illustrating a method for using indexed alphanumeric identifiers.

FIG. 3 is a flow diagram illustrating a Method 38 for using indexed alphanumeric identifiers. At Step 40, an alphanumeric identifier is received from a target device on a communications network. At Step 42, an advertising category being queried by the alphanumeric identifier is determined. At Step 44, a pre-determined advertisement is retrieved for the determined advertising category. At Step 46, a message is sent to the target device. The message allows the target device to receive information based on the alphanumeric identifier or receive the pre-determined advertisement instead.

Method 38 is illustrated with one exemplary embodiment. However, the present invention is not limited to such an embodiment and other embodiments can also be used to practice the invention.

In such an exemplary embodiment at Step 40, an alphanumeric identifier is received from a target device 12, 14, 16 on source network device 20, 22, 24 via a communications network 18. In one embodiment the alphanumeric identifier includes telephone numbers, instant message identifiers, or e-mail address identifiers, VoIP identifiers or IP identifiers.

At Step 42, an advertising category being queried by the alphanumeric identifier is determined using a database 20', 22' 24' associated with the source network device 20, 22, 24. For example, if a caller dialed 555-555-5555, on a mobile phone and the subscriber to that number was Pizza Hut, the source network device 20, 22, 24 on the communications network 18 would categorize that number as a restaurant, or more specifically, a pizza restaurant by sending the dialed number to an associated database 20', 22' 24'.

At Step 44, a pre-determined advertisement is selected for the advertising category from the database 20', 22' or 24'. For example, the source network device 20, 22, 24 matches the advertising category including restaurant information (e.g., a pizza restaurant, etc.) to a specific relevant pre-determined advertisement that is recorded and stored in a corresponding database 20', 22' or 24'.

At Step 46, a message is sent to the target device 12, 14, 16. The message allows the target device 12, 14, 16 to receive information based on the alphanumeric identifier or receive the pre-determined advertisement from the database 20', 22' or 24' instead.

In one embodiment, the message sent to the target device 12, 14, 16 including the pre-determined advertisement would be immediately displayed on the target device 12, 14, 16. The pre-determined advertisement might include the recorded announcement "Looking to order a pizza tonight? Domino's Pizza is offering a large pepperoni pizza, delivered hot and fresh to your door for $9.99. Press one to be connected to Domino's to take advantage of this great, money-saving offer, or press 2 to complete your call as dialed to Pizza Hut."

In another embodiment, the message sent to the target device 12, 14, 16 including the pre-determined advertisement allows a user to initiate to elect to display the advertisement, rather than immediately displaying the pre-determined advertisement. For example, in the above example, the message includes "Press 1 to hear about special, money-saving offers on pizza. Press 2 to connect your call."

In another embodiment, database 20', 22', 24' also could be utilized to send targeted print advertisements to subscribers based upon the types of queries placed from the target network device 12, 14, 16. For example, a residential mobile phone subscriber who frequently calls a number categorized in the database 20', 22', 24' as a florist might receive print advertisements or coupons for flowers in his phone bill, a separate bill either on paper or electronically. The subscriber's phone company could also sell this data to a print advertiser marketer or other businesses to target and mail print advertisement and/or coupons to residential phone customers based upon their calling habits.

In another embodiment, the target network device 12, 14, 16 includes application 26 with an internal database on a computer chip (e.g., ROM, flash, etc.), circuit board, and/or other hardware or firmware device installed or maintained inside the target network device 12, 14, 16. In such an embodiment, the internal database is updated periodically based on alphanumeric identifiers used and communications with the communications network 18.

Users of the methods and system earn revenue in a number of ways. For example, phone companies could charge advertisers for each listing in a database or cloud computing object, for each time a pre-determined advertisement is played, and/or for each call actually transferred to the advertiser's business at the conclusion of display of a pre-determined advertisement.

Cloud Computing

Figure 4:
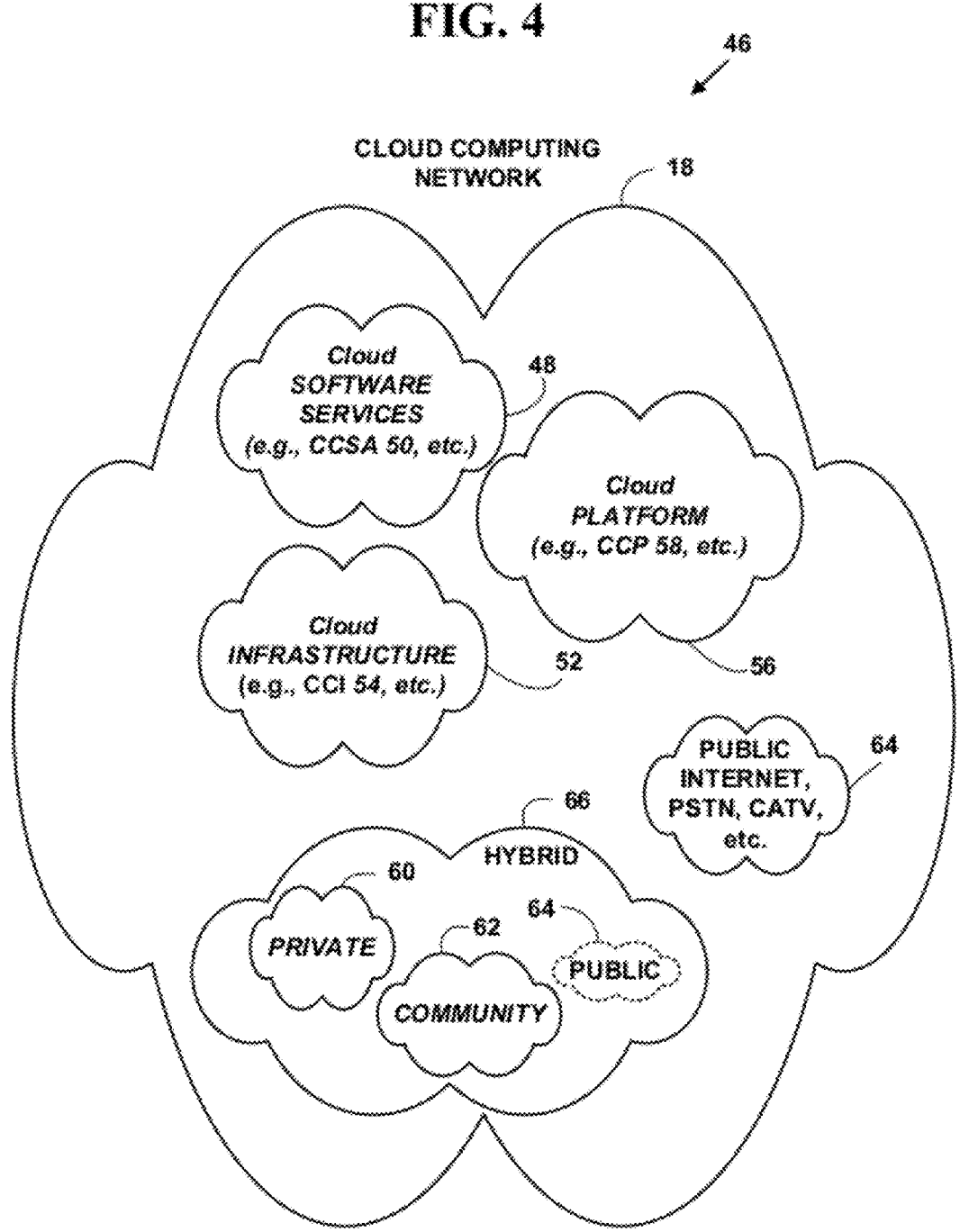
FIG. 4 is a block diagram illustrating an exemplary cloud communications network.

FIG. 4 is a block diagram 46 illustrating an exemplary cloud communications network 18. However, the present invention is not limited to this cloud computing model and other cloud computing models can also be used to practice the invention. The exemplary cloud communications network includes both wired and/or wireless components of public and private networks.

This exemplary cloud computing model for intelligent electronic information processing promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

The cloud communications network 18 provides on-demand self-service, broad network access, resource pooling, rapid elasticity and measured electronic services for electronic storage and retrieval.

The cloud source network device includes a server network device 20, 22, 24. In another embodiment, the cloud source network device includes a gateway and/or router and/or switch and/or edge server network device each with one or more processor.

In one embodiment, the cloud source network device 20, 22, 24 and/or the target network devices 12, 14, 16 include a wireless networking interface comprising $4^{th}$ generation (4G) Worldwide Interoperability for Microwave Access (WiMax) Long Term Evolution (LTE) wireless interface in communications with the cloud communications network 18. However, the present invention is not limited to this embodiment and other types of wireless networking interfaces can be used to practice the invention.

Exemplary cloud computing essential characteristics appear in Table 1. However, the present invention is not limited to these essential characteristics and more, fewer or other characteristics can also be used to practice the invention.

TABLE 1

On-demand electronic content retrieval services. Electronic content retrievers can unilaterally provision computing capabilities, such as server time and network storage, as needed automatically without requiring human interaction with each network server on the cloud communications network 18.
Broadband network access. Electronic content retrieval capabilities are available over plural broadband communications networks and accessed through standard mechanisms that promote use by heterogeneous thin or thick client platforms 12, 14, 16 (e.g., mobile phones, smart phones, tablet computers, laptops, PDAs, etc.). The broadband network access includes high speed network access such as 3G and/or 4G wireless and/or wired and broadband and/or ultra-broad band (e.g., WiMAX, etc.) network access.
Resource pooling. Electronic content retrieval computing resources are pooled to serve multiple requesters using a multi-tenant model, with different physical and virtual resources dynamically assigned and reassigned according to electronic content retrieval demand. There is location independence in that an requester of electronic content has no control and/or knowledge over the exact location of the provided by the electronic content retrieval resources but may be able to specify location at a higher level of abstraction (e.g., country, state, or datacenter). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale for electronic content retrieval. To the electronic content retriever, the electronic content capabilities available for provisioning appear to be unlimited and can be used in any quantity at any time.
Measured Services. Cloud computing systems automatically control and optimize resource use by leveraging a metering capability at some level of abstraction appropriate to the type of electronic content retrieval service (e.g., storage, processing, bandwidth, custom electronic content retrieval applications, etc.). Electronic content retrieval usage is monitored, controlled, and reported providing transparency for both the electronic content provider and the electronic content requester of the utilized electronic content retrieval service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 48 for an Electronic Advertising Services (CCSA 50). The capability to use the provider's applications 26, 27 running on a cloud infrastructure 52. The cloud computing applications 27 are accessible from the server network devices 20, 22, 24 from various client target network devices 12, 14, 16 through a thin client interface such as a web browser plug-in 28, etc. The user does not manage or control the underlying cloud infrastructure 52 including network, servers, operating systems, storage, or even individual application 26, 27 capabilities, with the possible exception of limited user-specific application configuration settings.

Cloud Computing Infrastructure 52 for the an Electronic Content Retrieval Service (CCI 54). The capability provided to the user is to provision processing, storage, networks 18, 60, 62, 64, 66 and other fundamental computing resources where the consumer is able to deploy and run arbitrary software, which can include operating systems and applications 26, 27. The user does not manage or control the underlying cloud infrastructure 52 but has control over operating systems, storage, deployed applications, and possibly limited control of select networking components (e.g., host firewalls, etc.).

Cloud Computing Platform 56 for the an Electronic Content Retrieval Service (CCP 58). The capability provided to the user to deploy onto the cloud infrastructure 52 created or acquired applications created using programming languages and tools supported servers 20, 22, 24, etc.. The user not manage or control the underlying cloud infrastructure 52 including network, servers, operating systems, or storage, but has control over the deployed applications 26, 27 and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 60. The cloud network infrastructure is operated solely for an electronic content retrieval organization. It may be managed by the electronic content retrieval organization or a third party and may exist on premise or off premise.

Community cloud network 62. The cloud network infrastructure is shared by several different organizations and supports a specific electronic content retrieval community that has shared concerns (e.g., mission, security requirements, policy, compliance considerations, etc.). It may be managed by the different organizations or a third party and may exist on premise or off premise.

Public cloud network 64. The cloud network infrastructure such as the Internet, PSTN, CATV, etc. is made available to the general public or a large industry group and is owned by one or more organizations selling cloud services.

Hybrid cloud network 66. The cloud network infrastructure 52 is a composition of two and/or more cloud networks 18 (e.g., private 60, community 62, and/or public 64, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 48 for electronic content retrieval takes full advantage of the cloud paradigm by being service oriented with a focus on statelessness, low coupling, modularity, and semantic interoperability for electronic content retrieval.

In on exemplary embodiment, the application 26, 27, offers additional cloud services. The application 26, 27 offers the cloud computing Infrastructure 52, 54 as a cloud Service 48 (IaaS), including a cloud software service 50, the cloud Platform 56, 58 as a cloud Service 70 (PaaS) including a cloud software service 50, or offers Specific cloud software services as a cloud Service 48 (SaaS) including a cloud software service 50. The IaaS, PaaS and SaaS include one or more of cloud services 48 comprising networking, storage, server network device, virtualization, operating system, middleware, run-time, data and/or application services, or plural combinations thereof, on the cloud communications network 18.

The source and target cloud computing applications 26, 27 include an electronic content advertising and indexing service CCSA 50, a cloud computing platform CCP 52 for the electronic content advertising and indexing service and a cloud computing infrastructure CCI 54 for the electronic content advertising and indexing service.

Internet Television Services

The applications 26, 27 provide advertising from television services over the cloud communications network 18. The television services include CATV, satellite TV, Internet television, Web-TV, Internet Protocol Television (IPtv) and/or broadcast television advertising services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

Search Engine Services

The applications 26, 27 provide advertising from general search engine services. A search engine is designed to search for information on a cloud communications network 18 such as the Internet including World Wide Web servers, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

The applications 26, 27 provide advertising from general search engine services as stand alone services. In another embodiment, the applications 26, 27 provide general search engine services by interacting with one or more other public search engines (e.g., GOOGLE, BING, YAHOO, etc.) and/or private search engine services.

The applications 26, 27 also provide advertising from specialized search engine services, such as vertical search engine services by interacting with one or more other public vertical search engines (e.g., GALAXY.COM, etc.) and/or private search engine services.

However, the present invention is not limited to providing advertising from such general and/or vertical search engine services and more, fewer and/or other types of advertising can be provided from other types of general sand/or specialized search engine services can be used to practice the invention.

Social Networking Services

In one embodiment, the applications 26, 27 provide advertising from one or more social networking services including to/from one or more social networking web-sites (e.g., FACEBOOK, U-TUBE, TWITTER, MY-SPACE, MATCH.COM, E-HARMONY, GROUP ON, SOCIAL LIVING, etc.). The social networking web-sites also include, but are not limited to, social couponing sites, dating web-sites, blogs, RSS/ATOM feeds, and other types of information web-sites in which messages can be left or posted for a variety of social activities.

However, the present invention is not limited to the social networking services described and other public and private social networking services can also be used to practice the invention.

SKYPE Services

SKYPE is a proprietary voice-over-Internet Protocol (VoIP) service and software application originally created by Niklas Zennström, and owned by MICROSOFT since 2011. The service allows users to communicate with peers by voice, video, and instant messaging over the Internet. Phone calls may be placed to recipients on the traditional telephone networks. Calls to other users within the SKYPE service are free of charge, while calls to landline telephones and mobile phones are charged via a debit-based user account system. S SKYPE e has also become popular for its additional features, including file transfer, and videoconferencing. Other SKYPE like services include SIP and H.323-based services, such as EMPATHY, LINPHONE, EKIGA, as well as the GOOGLE TALK services.

Cloud Storage

Cloud storage of desired electronic content on a cloud communications network 18 includes agility, scalability, elasticity and multi-tenancy. Although a storage foundation may be comprised of block storage or file storage such as that exists on conventional networks, cloud storage is typically only exposed to requesters of desired electronic content as "cloud storage objects" (e.g., 68, FIG. 5, etc.).

Figure 5:
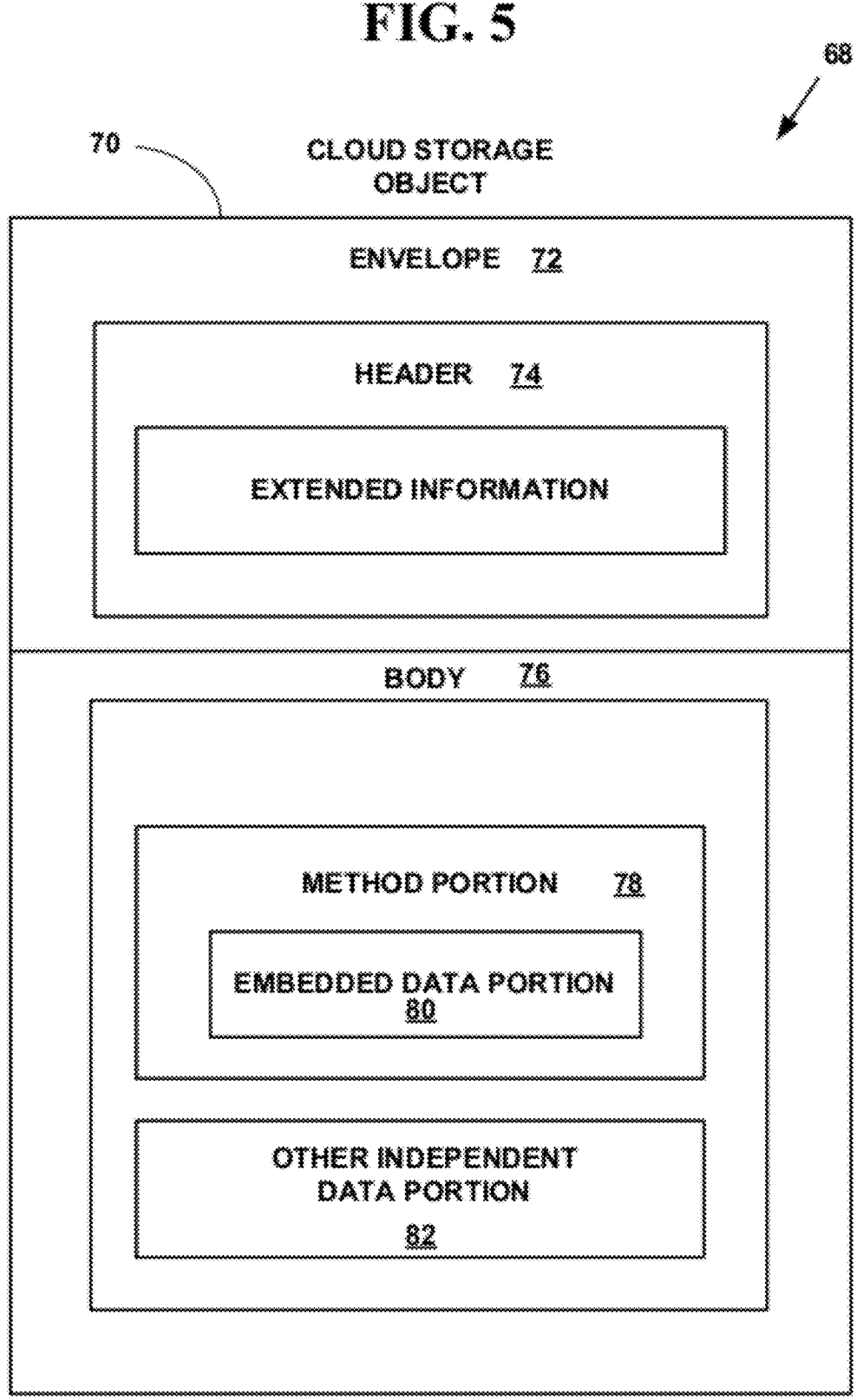
FIG. 5 is a block diagram illustrating an exemplary cloud storage object.

FIG. 5 is a block diagram 68 illustrating an exemplary cloud storage object 70.

The cloud storage object 70 includes an envelope portion 72, with a header portion 74, and a body portion 76. However, the present invention is not limited to such a cloud storage object 70 and other cloud storage objects and other cloud storage objects with more, fewer or other portions can also be used to practice the invention.

The envelope portion 72 uses unique namespace Uniform Resource Identifiers (URIs) and/or Uniform Resource Names (URNs), and/or Uniform Resource Locators (URLs) unique across the cloud communications network 18 to specify, location and version information and encoding rules used by the cloud storage object 70. For more information, see IETF RFC-3305, Uniform Resource Identifiers (URIs), URLs, and Uniform Resource Names (URNs), the contents of which are incorporated by reference.

The envelope portion 72 of the cloud storage object 70 is followed by a header portion 74. The header portion includes extended information about the cloud storage objects such as authorization and/or transaction information, etc.

The body portion 76 includes methods 78 (i.e., a sequence of instructions, etc.) for using embedded application-specific data in data elements 80. The body portion 76 typically includes only one portion of plural portions of the application-specific data so the cloud storage object 70 can provide distributed, redundant fault tolerant, security and privacy features described herein.

Cloud storage objects 70 have proven experimentally to be a highly scalable, distributed, available and reliable layer of abstraction that also minimizes the limitations of common file systems. Cloud storage objects 70 also provide low latency and low storage and transmission costs.

Cloud storage objects 70 are comprised of plural distributed storage locations, but function as a single storage object, are highly fault tolerant through redundancy and provide distribution of desired electronic content across public communication networks 64, and one or more private networks 60, community networks 62 and hybrid networks 66 of the cloud communications network 18. Cloud storage objects 68 are also highly durable because they also initiate creation of copies of portions of desired electronic content across such networks 60, 62, 64, 66 of the cloud communications network 18. Cloud storage objects 70 are stored on one or more of the 60, 62, 64, 66 networks of the cloud communications network 18 and/or on the target network device 12, 14, 16. Cloud storage objects 70 are transparent to a requester of desired electronic content and are managed by cloud computing application 26, 27.

Cloud storage objects 70 comprise plural storage objects distributed on cloud source network devices 20, 22, 24, and/or other storage devices (e.g., gateway, router, bridge, switch, edge server, etc.) and/or the target network devices 12, 14, 16 with a size up to hundreds of terabytes, each accompanied by with a few kilobytes of metadata. Cloud storage objects 70 are organized into and each identified by a unique identifier unique across the whole cloud communications network 18. However, the present invention is not limited to the cloud storage objects described, and more fewer and other types of cloud storage objects can be used to practice the invention.

Cloud storage objects 70 present a single unified namespace or object-space and manages desired electronic content by user or administrator-defined policies storage and retrieval policies.

Cloud storage objects 70 include Representational state transfer (REST), Simple Object Access Protocol (SOAP) and/or an Application Programming Interface (API) and/or other types of cloud storage objects. However, the present invention is not limited to the cloud storage objects described, and more fewer and other types of cloud storage objects can be used to practice the invention.

REST characterizes and constrains macro-interactions of the four components of a cloud communications network 18, namely origin servers, gateways, proxies and clients, without imposing limitations on the individual participants.

SOAP is a protocol specification for exchanging structured information in the implementation of cloud services. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

An API is a particular set of rules and specifications that software programs can follow to communicate with each other. It serves as an interface between different software programs and facilitates their interaction.

Number Indexing for Advertising with Cloud Computing

FIGS. 6A and 6B are a flow diagram illustrating a Method 84 for alphanumeric identifier indexing for advertising with cloud computing. At Step 86, plural alphanumeric identifiers are received on a source cloud application on a source network device with one or more processors via a cloud communications network comprising: one or more public communication networks, one or more private networks, one or more community networks and one or more hybrid networks. The plural received alphanumeric identifiers include connectable and disconnected alphanumeric identifiers and valid and invalid alphanumeric identifiers. At Step 88, the source cloud application on source network device categorizes the received plural alphanumeric identifiers into a plural different pre-determined advertising categories. At Step 90, the source cloud application on the source network device stores the categorized plural alphanumeric identifiers in a cloud storage object. The cloud storage object comprises a plural separate storage locations distributed across the cloud communications network but functions as a single storage object. A target cloud application on a target network device cannot determine which cloud source network devices on the one or more public, private, community or hybrid networks on the cloud communications network may have stored the cloud storage object or a portion thereof, thereby providing security and privacy for recording requests made by the target cloud application on the target network device. In FIG. 6B at Step 92, the source cloud application on the source network device associates plural pre-determined advertisements stored in the cloud storage object with the plural categorized alphanumeric identifiers stored in the cloud storage object. At Step 94, a target alphanumeric identifier is received on the source cloud application on the source network device from a target cloud application on a target network device with one or more processors via the cloud communications network. The target network device can contact the source network device from anywhere on the cloud computing network. The target alphanumeric identifier is used to connect the target network device to a desired network device anywhere on the cloud communications network. At Step 96, the source cloud application on the source network device retrieves a pre-determined advertisement from the plural categorized alphanumeric identifiers stored in the cloud storage object based on the received target alphanumeric identifier. At Step 98, a secure message is sent from the source cloud application on the source network device to the target network device via the cloud communications network. The secure message includes electronic information that allows the target network device to make a selection input to connect to the desired network device or to receive and display the retrieved pre-determined advertisement and connect to another network device associated with the retrieved pre-determined advertisement instead.

Method 84 is illustrated with one exemplary embodiment. However, the present invention is not limited to such an embodiment and other embodiments can also be used to practice the invention.

In such an exemplary embodiment, in FIG. 6A at Step 86, plural alphanumeric identifiers are received on a source cloud application 26/27 on a source network device 20, 22, 24 with one or more processors via a cloud communications network 18 comprising: one or more public communication networks 64, one or more private networks 60, one or more community networks 62 and one or more hybrid networks 66. The plural received alphanumeric identifiers include connectable and un-connectable alphanumeric identifiers and valid and invalid alphanumeric identifiers.

Connectable alphanumeric identifiers include those to which a device can be immediately connected to. Un-connectable alphanumeric identifiers include those to which a device cannot be immediately connected to (e.g., the device is off, its battery has expired, it is out range to communicate with a communication network, etc.).

Valid alphanumeric identifiers includes those alphanumeric identifiers that are currently valid. Invalid alphanumeric identifiers include those that are not valid to do discontinuation of a network device and/or a service to a network device and/or a disabling or an old or obsolete network device, etc.

The alphanumeric identifiers, include, but are not limited to, telephone numbers, voice-over-Internet Protocol (VoIP) identifiers including, but not limited to, SKYPE identifiers, Internet Protocol (IP) identifiers, an instant message (IM) identifier, a text message identifier, an e-mail address identifier a social network identifier, a social networking hash code (e.g., TWITTER hash code, etc.), etc. However, the present invention is not limited to such an embodiment and more, fewer or other types of alphanumeric identifiers can be used to practice the invention.

At Step 88, the source cloud application 26/27 on source network device 20, 22, 24 categorizes the received plural alphanumeric identifiers into a plural different pre-determined advertising categories (e.g., with Methods 25 and 36 described above).

Pre-determined advertisements in the plural different pre-determined advertising categories are sold to one or more advertisers for an advertising category. For example, for pizza restaurants, Domino's Pizza my purchase all advertising for pizza restaurants. Any alphanumeric identifiers received and categorized for pizza restaurants would be associated with Domino's Pizza advertising.

The pre-determined advertisements are also sold to plural advertisers for advertising categories. The pre-determined advertisements are associated based on a number of pre-determined methods such as round-robin method, a weighted method, depending on an amount of advertising purchased, etc At Step 90, the source cloud application 26/27 on the source network device 20, 22, 24 stores the categorized plural alphanumeric identifiers in a cloud storage object 70. The cloud storage object 70 comprises a plural separate storage locations distributed across the cloud communications network 18 but functions as a single storage object. A target cloud application 26/27 on a target network device 12, 14, 16 cannot determine which cloud source network devices 20, 22, 24 on the one or more public 64, private 60, community 62 or hybrid networks 66 on the cloud communications network 18 may have stored the cloud storage object 70 or a portion thereof, thereby providing security and privacy for recording requests made by the target cloud application 26/27 on the target network device 12, 14, 16.

In FIG. 6B at Step 92, the source cloud application 26/27 on the source network device 20, 22, 24 associates plural pre-determined advertisements stored in the cloud storage object 70 with the plural categorized alphanumeric identifiers stored in the cloud storage object 70.

The pre-determined advertisement includes a recorded audio, video, graphical or electronic text advertisement. However, the present invention is not limited to this embodiment and more, fewer or other types of pre-determined advertisements can be used to practice the invention.

At Step 94, a target alphanumeric identifier is received on the source cloud application 26/27 on the source network device 20, 22, 24 from a target cloud application 26/27 on a target network device 12, 14, 16 with one or more processors via the cloud communications network 18. The target network device 12, 14, 16 can contact the source network device 20, 22, 24 from anywhere on the cloud computing network 18. The target alphanumeric identifier is used to connect the target network device 12, 14, 16 to a desired network device 20, 22, 24 and/or 12, 14, 16 anywhere on the cloud communications network 18.

The target alphanumeric identifiers, include, but are not limited to, telephone numbers, voice-over-Internet Protocol (VoIP) identifiers, including, but not limited to, SKYPE identifiers, Internet Protocol (IP) identifiers, an instant message (IM) identifier, a text message identifier, an e-mail address identifier a social network identifier, a social networking hash code (e.g., TWITTER hash code, etc.), etc. However, the present invention is not limited to such an embodiment and more, fewer or other types of target alphanumeric identifiers can be used to practice the invention.

At Step 96, the source cloud application 26/27 on the source network device 20, 22, 24 retrieves a pre-determined advertisement from the plural categorized alphanumeric identifiers stored in the cloud storage object 70 based on the received target alphanumeric identifier.

For example, an advertising category being queried by the target alphanumeric identifier is determined using a cloud storage object 70 associated with the source network device 20, 22, 24. For example, if a user of a target network device sent a target alphanumeric identifier by dialing 555-555-5555, on a mobile phone, sent the text "pizza" via text message, IM, e-mail, etc., sent the social network TWITTER hash code "#pizza," etc. and the subscriber to the alphanumeric identifier was Pizza Hut, the source network device 20, 22, 24 on the cloud network 18 would categorize that number as a restaurant, or more specifically, a pizza restaurant or pizza delivery service.

At Step 98, a secure message is sent from the source cloud application 26/27 on the source network device 20, 22, 24 to the target network device 12, 14, 16 via the cloud communications network 18. The secure message includes electronic information that allows the target network device 12, 14, 16 to make a selection input to connect to the desired network device 12, 14, 16 and/or 20, 22, 24 or to receive and display the retrieved pre-determined advertisement and connect to another network device 12, 14, 16 and/or 20, 22, 24 associated with the retrieved pre-determined advertisement instead.

For example, the secure message sent to the target device 12, 14, 16 including the pre-determined advertisement would be immediately displayed on the target device 12, 14, 16. The pre-determined advertisement might include a recorded voice announcement, text message, IM message, or e-mail message including "Looking to order a pizza tonight? Domino's Pizza is offering a large pepperoni pizza, delivered hot and fresh to your door for $9.99. Press/text/IM/enter one to be connected to Domino's to take advantage of this great, money-saving offer, or press/text/IM/e-mail/enter two to complete your call as dialed to Pizza Hut."

The secure message sent to the target device 12, 14, 16 including the pre-determined advertisement may also allow a user to initiate to elect to display the advertisement, rather than immediately displaying the pre-determined advertisement. For example, in the above example, the message includes "Press/text/IM/enter one to hear or read about special, money-saving offers on pizza. Press two to connect your original request."

The secure message is sent using any of the security and/or encryption techniques described above.

FIG. 7 is a block diagram illustrating a Method 100 for alphanumeric identifier indexing for advertising with cloud computing. At Step 102, a selection input is received on the source cloud application on the source network device via the cloud computing network from the target network device. The selection input is a response to a secure message sent by the source network device. At Step 104, the source cloud application on the source network device stores results from the selection input in a cloud storage object. The results from the selection input are available to a plural other network devices owned by an owner of the target network device and also available to plural logins owned by the owner of the target network device on a plural other server network devices at any time from anywhere on the cloud computing network, thereby providing a synchronization of information via the cloud computing network across all devices and across all logins for the owner of the target network device.

Method 100 is illustrated with one exemplary embodiment. However, the present invention is not limited to such an embodiment and other embodiments can also be used to practice the invention.

In such an exemplary embodiment, At Step 102, a selection input is received on the source cloud application 26/27 on the source network device 20, 22, 24 via the cloud computing network 18 from the target network device 12, 14, 16. The selection input is a response to a secure message sent by the source network device 20, 22, 24 (e.g., at Step 98 of Method 84, etc.).

At Step 104, the source cloud application 26/27 on the source network device 20, 22, 24 stores results from the selection input in a cloud storage object 70. The results from the selection input are available to a plural other network devices 14, 16 owned by an owner of the target network device 12 and also available to plural logins owned by the owner of the target network device 12, 14, 16 on a plural other server network devices 20, 22, 24 at any time from anywhere on the cloud computing network 18, thereby providing a synchronization of information via the cloud computing network 18 across all devices and across all logins for the owner of the target network device 12, 14, 16.

The plural logins include electronic mail logins, electronic commerce logins (e.g., AMAZON.COM, BUY.COM, etc.) and social networking logins (e.g., FACEBOOK, TWITTER, GROUPON, etc.).

The methods and system described herein provides an opportunity for advertising goods and services to the pubic in a way that is not currently being utilized. Each day, millions and millions of telephone calls are placed, millions or instant messages, text message and e-mails are sent. Each day advertisers could reach hundreds of millions of consumers by utilizing the method and systems.

Users of the methods and system described herein can also store the alphanumeric identifiers used from any target device, match those alphanumeric identifiers to pre-determined advertising categories in the cloud storage object 70, and maintain user profiles including types of goods and services used by a particular user for purposes of targeted marketing from direct mail or telemarketing.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for automatically indexing alphanumeric identifiers with cloud computing, comprising:

receiving a plurality of alphanumeric identifiers on a source cloud application on a source network device with one or more processors via a cloud communications network comprising: one or more public communication networks, one or more private networks, one or more community networks and one or more hybrid networks, wherein the plurality of received alphanumeric identifiers include connectable and disconnected alphanumeric identifiers and valid and invalid alphanumeric identifiers;

categorizing on the source cloud application on source network device the plurality of alphanumeric identifiers into a plurality of different pre-determined advertising categories;

storing from the source cloud application on the source network device the categorized plurality of alphanumeric identifiers in a cloud storage object, wherein the cloud storage object comprises a plurality of separate storage locations distributed across the cloud communications network but functions as a single storage object, and wherein a target cloud application on a target network device cannot determine which cloud source network devices on the one or more public, private, community or hybrid networks on the cloud communications network may have stored the cloud storage object or a portion thereof, thereby providing security and privacy for recording requests made by the target cloud application on the target network device;

associating on the source cloud application on the source network device a plurality of pre-determined advertisements stored in the cloud storage object with the plurality of categorized alphanumeric identifiers stored in the cloud storage object;

receiving a target alphanumeric identifier on the source cloud application on the source network device from a target cloud application on a target network device with one or more processors via the cloud communications network, wherein the target network device can contact the source network device from anywhere on the cloud computing network and wherein the target alphanumeric identifier is used to connect the target network device to a desired network device anywhere on the cloud communications network;

retrieving on the source cloud application on the source network device a pre-determined advertisement from the plurality of categorized alphanumeric identifiers stored in the cloud storage object based on the received target alphanumeric identifier; and sending a secure message from the source cloud application on the source network device to the target network device via the cloud communications network, wherein the message includes electronic information that allows the target network device to make a selection input to connect to the desired network device or to receive and display the retrieved pre-determined advertisement and connect to another network device associated with the retrieved pre-determined advertisement instead.

2. A non-transitory computer readable medium having stored therein a plurality of instructions for causing one or more processors on a network device to execute the steps of:

receiving a plurality of alphanumeric identifiers on a source cloud application on a source network device with one or more processors via a cloud communications network comprising: one or more public communication networks, one or more private networks, one or more community networks and one or more hybrid networks, wherein the plurality of received alphanumeric identifiers include connectable and disconnected alphanumeric identifiers and valid and invalid alphanumeric identifiers;

categorizing on the source cloud application on source network device the plurality of alphanumeric identifiers into a plurality of different pre-determined advertising categories;

storing from the source cloud application on the source network device the categorized plurality of alphanumeric identifiers in a cloud storage object, wherein the cloud storage object comprises a plurality of separate storage locations distributed across the cloud communications network but functions as a single storage object, and wherein a target cloud application on a target network device cannot determine which cloud source network devices on the one or more public, private, community or hybrid networks on the cloud communications network may have stored the cloud storage object or a portion thereof, thereby providing security and privacy for recording requests made by the target cloud application on the target network device;

associating on the source cloud application on the source network device a plurality of pre-determined advertisements stored in the cloud storage object with the plurality of categorized alphanumeric identifiers stored in the cloud storage object;

receiving a target alphanumeric identifier on the source cloud application on the source network device from a target cloud application on a target network device with one or more processors via the cloud communications network, wherein the target network device can contact the source network device from anywhere on the cloud computing network and wherein the target alphanumeric identifier is used to connect the target network device to a desired network device anywhere on the cloud communications network;

retrieving on the source cloud application on the source network device a pre-determined advertisement from the plurality of categorized alphanumeric identifiers stored in the cloud storage object based on the received target alphanumeric identifier; and sending a secure message from the source cloud application on the source network device to the target network device via the cloud communications network, wherein the message includes electronic information that allows the target network device to make a selection input to connect to the desired network device or to receive and display the retrieved pre-determined advertisement and connect to another network device associated with the retrieved pre-determined advertisement instead.

3. The method of claim 1 wherein the alphanumeric identifier and the target alphanumeric identifier include a telephone number, voice-over-Internet Protocol identifier, an Internet Protocol identifier, an instant message identifier, a text message identifier, an e-mail address identifier, a social network identifier, a social networking hash code, or a combination thereof.

4. The method of claim 1 wherein the target alphanumeric identifier initiates cable television advertising, satellite television advertising, Internet television advertising, search engine services advertising, social network advertising or a combination thereof.

5. The method of claim 1 wherein the step of sending a secure message includes securely sending the message with a pre-determined security or encryption method.

6. The method of claim 5 wherein the pre-determined security or encryption method includes a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), or a Transport Layer Security (TLS) security or encryption method.

7. The method of claim 1 wherein the cloud storage object includes one or more of a REpresentational State Transfer (REST) or Simple Object Access Protocol (SOAP) cloud storage objects, portions thereof, or a combination thereof.

8. The method of claim 1 wherein source cloud application offers the cloud computing Infrastructure as a cloud Service (IaaS), the cloud computing Platform, as a cloud Service (PaaS) or offers Specific cloud electronic content retrieval and storage services as a cloud Service (SaaS) including a cloud software service, wherein the IaaS, PaaS and SaaS include one or more of cloud electronic advertising indexing and retrieval services comprising networking, storage, server network device, virtualization, operating system, middleware, run-time, data or application services, or plural combinations thereof, on the cloud communications network.

9. The method of claim 1 wherein the cloud communications network includes on-demand electronic content retrieval and storage services, broadband network access, resource pooling, rapid elasticity and measured network services for cloud electronic advertising indexing and retrieval services.

10. The method of claim 1 wherein the target network devices include desktop computers, laptop computers, tablet computers, mobile phones, non-mobile phones, smart phones, Internet phones, Internet appliances, personal digital/data assistants (PDA), digital cameras, portable game consoles, non-portable game consoles, cable television (CATV) set-top boxes, satellite television boxes, or digital televisions including a high definition television (HDTV) or a three-dimensional (3D) television.

11. The method of claim 1 wherein the source network device and the target network device include a wireless networking interface comprising a Worldwide Interoperability for Microwave Access (WiMax) wireless networking interface with $4^{th}$ generation (4G) wireless speeds for communicating with the cloud communications network.

12. The method of claim 1 further comprising:
receiving a selection input on the source cloud application on the source network device via the cloud computing network from the target network device, wherein the selection input is a response to the secure message sent by the source network device; and
storing in the cloud storage object from the source cloud application on the source network device results from the selection input, wherein the results from the selection input are available to a plurality of other network devices owned by an owner of the target network device and also available to a plurality of logins owned by the owner of the target network device on a plurality of other server network devices at any time from anywhere on the cloud computing network, thereby providing a synchronization of information via the cloud computing network across all devices and across all logins for the owner of the target network device.

13. The method of claim 12 wherein the plurality of logins include electronic mail logins, electronic commerce logins and social networking logins.

* * * * *